J. C. SCHLEICHER.
PROPELLER FOR AIRSHIPS.
APPLICATION FILED MAY 1, 1916.
1,233,610.
Patented July 17, 1917.
2 SHEETS—SHEET 1.
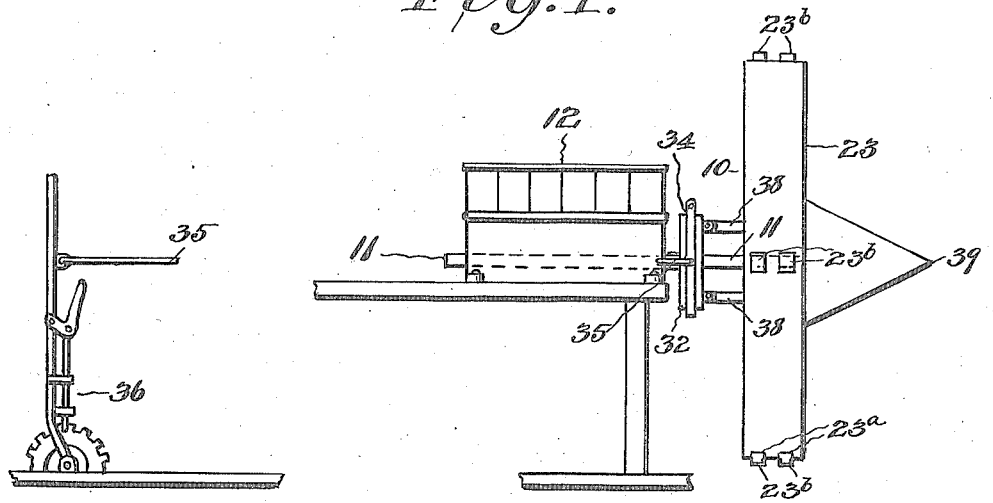
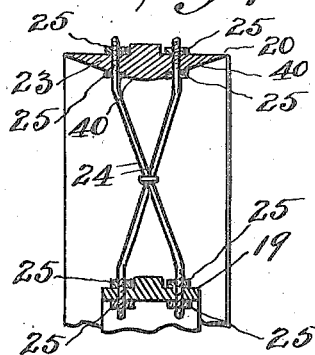
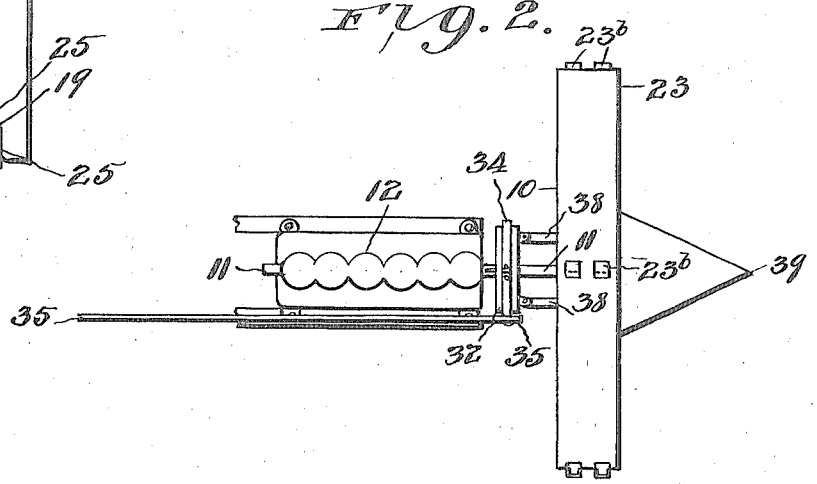
Inventor
John C. Schleicher
By Blackwood Bros.,
Attorneys

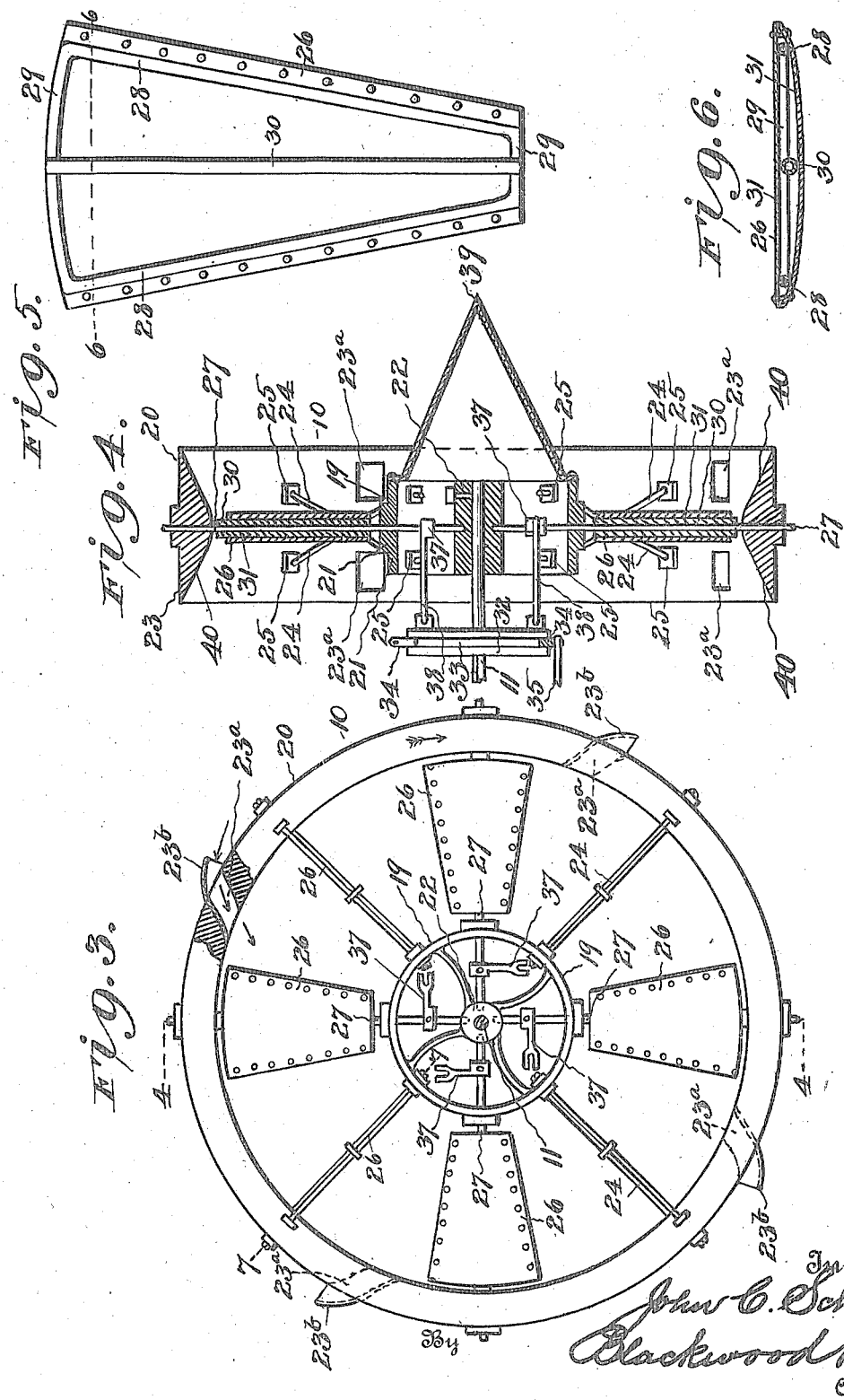

UNITED STATES PATENT OFFICE.

JOHN C. SCHLEICHER, OF MOUNT VERNON, NEW YORK.

PROPELLER FOR AIRSHIPS.

1,233,610.

Specification of Letters Patent. Patented July 17, 1917.

Application filed May 1, 1916. Serial No. 94,707.

*To all whom it may concern:*

Be it known that I, JOHN C. SCHLEICHER, a citizen of the United States, residing at Mount Vernon, in the county of Westchester and State of New York, have invented certain new and useful Improvements in Propellers for Airships, of which the following is a specification.

My invention relates to a propeller for airships.

It has for its object particularly to provide a propeller for airships having adjustable, reversible blades and means for adjusting the blades to any pitch without stopping the engine, whereby the speed of the ship can be regulated, the propeller caused to act as a brake, the ship stopped or the direction of the power reversed without interfering or stopping the rotation of the propeller.

It has for a further object to provide a propeller with means for causing air to be forced therein radially inward and concentrated and distributed horizontally or lengthwise thereof.

It has for a further object to provide a propeller which, when used in connection with an air ship, may be regulated to compensate or adjust itself to differing degrees of air pressure of various altitudes.

It has for a further object to provide increased driving power by means of the air forced through the air inlets.

It also has for its object to provide a propeller the construction of which enables it to act as an efficient flywheel.

It has for a further object to provide a propeller having means for reducing to a minimum the surface presented to the wind in the direction of the flight of the ship and for concentrating and deflecting larger amounts of wind onto the propeller blades than has heretofore been possible, whereby it offers as little resistance to the air as possible and the maximum speed is obtained from the propeller.

It has for a further object to provide strong, rigid propeller blades and means for mounting and guarding them from injury, whereby the maximum service is assured and the chances of accidents to the ship and consequent loss of life or injury to the aviator is reduced.

In the drawings:—

Figure 1 is a side elevation of my propeller and adjusting means therefor applied.

Fig. 2, a top plan view.

Fig. 3, a front view of the propeller and adjusting means therefor, parts being omitted.

Fig. 4, a partial sectional view taken on the line 4—4 of Fig. 3.

Fig. 5, a detail view of one of the propeller blades, the plate forming the rear face being removed.

Fig. 6, a sectional view taken on the line 6—6 of Fig. 5.

Fig. 7, a fragmentary sectional view taken on the line 7—7 of Fig. 3.

Like reference characters designate corresponding parts in the several figures of the drawings illustrating my invention.

Referring to the drawings, 10 represents the propeller which is driven by the drive shaft 11 of any suitable engine 12.

The propeller consists of a rotatable support comprising an inner member 19 and an outer member 20. The inner member is provided with a rim 21 and a hub 22 by which it is secured on the drive shaft 11. The outer member consists of a rim 23 having a series of radially disposed air inlet passages 23$^a$ therethrough with curved plates or hoods 23$^b$ for deflecting air through the passages during the operation of the propeller. The outer member is supported on the inner member by means of pairs of intersecting spokes 24, the outer ends of which extend through the rim 23 and the inner ends of which extend through the rim 21 and said ends are threaded and provided with nuts 25 on each side of each rim, thereby providing means for regulating the tension of the spokes and securing the members of the support in rigid relation.

Propeller blades 26 are located between the rims of the rotatable support and secured upon shafts 27, the outer ends of which are journaled in the rim 23 and the inner ends of which extend through the rim 21 into the hub 22 and are journaled therein.

Each propeller blade is constructed of a frame consisting of side tubes 28, end tubes 29 and a central tube 30 through which the shaft 27 to which it is secured extends and plates 31 are placed on opposite sides of this frame and riveted together so as to inclose the frame and form a flat front face and a rear curved face for the blade.

A disk 32 is mounted on the shaft 11 so as to rotate therewith and be slidable longitudinally thereon and the disk is provided with a circumferential groove 33 loosely engaged by a ring 34 pivoted to one end of a rod 35, the other end of which is pivoted to the operating arm of a pawl and rack device 36, whereby the disk can be slid on the countershaft and held at the desired points thereon.

Arms 37 are secured on the inner ends of the shafts 27 and their outer ends are pivotally connected to the inner ends of links 38, the outer ends of which are pivotally connected to the disk 32, whereby when the disk is slid on the countershaft, the shafts of the propeller blades will be turned so as to reverse the blades or change their pitch.

To provide means for directing and concentrating wind upon the propeller blades from all directions, a beveled conical cap 39 is secured to the front of the rim 21 and the rim 23 is provided with outwardly beveled inner faces 40 giving it a triangular shape in cross-section and these beveled faces also serve to reduce the surface presented to the air in the direction of flight.

It will be readily understood from the foregoing description considered in connection with the drawings, that by moving the lever arm of the pawl and rack device 36 in the proper direction and to the required extent, the disk 32 will be slid on the countershaft 11 and through the medium of the links 38 and arms 37, operatively connecting the disk 32 with the shafts 27, said shafts will be turned and the blades 26 thereon adjusted to the desired pitch.

It will also be understood that on account of the beveled faces of the cap 39 and rim 23 that the wind will be directed and concentrated onto the wings 26 from all directions, and on account of the air inlet passages in the outer member of the support the propelling power will be greatly increased by reason of the air forced through the inlet passages by the motion of the propeller. It will also be understood that by reason of the extra air pressure forced through the air inlets additional pressure will obtain in its forward travel thereby creating greater speed.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:

1. In a propeller for air ships, a driving shaft, a support thereon comprising inner and outer members and a hub, means for allowing air to be introduced through the outer member, propeller blades having shafts rotatably journaled in said inner and outer members and hub and means for rotating the propeller blades for the purpose of adjusting the pitch thereof, said means secured to the shafts between the inner member and hub.

2. In a propeller for air ships, a rotatable support comprising inner and outer members and a hub spaced apart from each other, a driving shaft on which said hub is mounted, shafts journaled in the inner and outer members and hub, propeller blades mounted on said shafts, means rigidly secured to the shafts by which they are adapted to be operated, and air inlets in the outer member.

3. In a propeller for air ships, a rotatable support comprising inner and outer ring-like members and a hub spaced apart from each other, means rigidly connecting said hub with the inner ring-like member, a driving shaft on which said hub is mounted, shafts journaled in the inner and outer ring-like members and hub, propeller blades mounted on said shafts and means for operating the propeller blades secured to the said shafts between the inner ring-like member and the hub.

4. In a propeller for air ships, a rotatable support comprising inner and outer members and a hub, rotatable shafts mounted in the outer member and hub and passing through the inner member, propeller blades on said shafts, a double series of air inlets in said outer member, one series arranged in the rear of the propeller blades and the other series arranged in the front of the propeller blades and means for adjusting the pitch of the propeller blades rigidly secured to the shafts of said propeller blades within the inner member.

5. In a propeller for airships, a driving shaft, a rotatable support comprising an outer rim having a converging inner front face and an inner rim having a conical cap the face of which converges oppositely to the adjacent converging face of the outer rim, radially extending shafts journaled in said inner and outer rims, propeller blades mounted on said shafts between said inner and outer rims, the converging face of said outer rim and said cap coacting in directing and concentrating air onto said propeller blades, a member rotatable with and slidable on said driving shaft and means operatively connecting the shafts of the propeller blades with the rotatable and slidable member.

6. In a propeller for airships, a driving shaft, a rotatable support comprising an outer rim having converging inner faces and air inlet passages and an inner rim having a conical cap the face of which converges oppositely to the adjacent converging face of the outer rim, radially extending shafts journaled in said inner and outer rims, propeller blades mounted on said shafts between said inner and outer rims, the converging face of said cap and the adjacent converging face of said outer rim co-acting in directing and concentrating air onto said propeller blades, a member rotatable with and slidable on said driving shaft and means operatively connecting the shafts of the propeller blades with the rotatable and slidable member.

7. In a propeller for airships, a driving shaft, a rotatable support comprising an outer rim having converging inner faces and air inlet passages with deflectors, and an inner rim having a conical cap the face of which converges oppositely to the adjacent converging face of the outer rim, a hub mounted on said driving shaft, radially extending shafts journaled in said inner and outer rims and the hub, propeller blades mounted on said shafts between said inner and outer rims, the converging face of said cap and the adjacent converging face of said outer rim co-acting in directing and concentrating air onto said propeller blades, a member rotatable with and slidable on said driving shaft and means operatively connecting the shafts of the propeller blades with the rotatable and slidable member.

8. In a propeller for airships, a driving shaft, a rotatable support comprising an outer rim having converging inner faces and air inlet passages with curved deflectors, and an inner rim having a conical cap the face of which converges oppositely to the adjacent converging face of the outer rim, radially extending shafts journaled at one end in said inner rim and at the other end in said outer rim at the apex of its converging faces, propeller blades mounted on said shafts between said inner and outer rims, the converging face of said cap and the adjacent converging face of said outer rim co-acting in directing and concentrating air onto said propeller blades, a member rotatable with and slidable on said driving shaft and means operatively connecting the shafts of the propeller blades with the rotatable and slidable member.

9. In a propeller for airships, a driving shaft, a rotatable support comprising an outer rim having a converging inner front face and an inner rim having a conical cap the face of which converges oppositely to the adjacent converging face of the outer rim, radially extending shafts journaled in said inner and outer rims, propeller blades each having a flat front face and a convex rear face and mounted on said shafts between said inner and outer rims, the converging face of said outer rim and said cap co-acting in directing and concentrating air onto the flat front faces of said propeller blades, a member rotatable with and slidable on said driving shaft and means operatively connecting the shafts of the propeller blades with the rotatable and slidable member.

In testimony whereof I affix my signature in the presence of two witnesses.

JOHN C. SCHLEICHER.

Witnesses:
CHAS. W. BLACKWOOD,
JAS. H. BLACKWOOD.